United States Patent [19]

Burns

[11] Patent Number: 5,417,115
[45] Date of Patent: May 23, 1995

[54] DIELECTRICALLY ISOLATED RESONANT MICROSENSORS

[75] Inventor: David W. Burns, Minneapolis, Minn.

[73] Assignee: Honeywell Inc., Minneapolis, Minn.

[21] Appl. No.: 95,343

[22] Filed: Jul. 23, 1993

[51] Int. Cl.$^6$ ............................................. G01L 11/00
[52] U.S. Cl. ........................................ 73/778; 73/702
[58] Field of Search .................. 73/778, 862.59, 702, 73/774

[56] References Cited

U.S. PATENT DOCUMENTS

| | | | |
|---|---|---|---|
| 3,413,573 | 11/1968 | Nathanson et al. | 332/178 |
| 3,470,400 | 9/1969 | Weisbord | 310/15 |
| 3,486,383 | 12/1970 | Riordan | 73/517 |
| 3,657,667 | 4/1972 | Nishikubo et al. | 331/116 M |
| 4,535,638 | 8/1985 | EerNisse et al. | 73/862.59 |
| 4,598,381 | 7/1986 | Cucci | 364/558 |
| 4,649,630 | 3/1987 | Boland et al. | 29/580 |
| 4,801,897 | 1/1989 | Flecken | 331/65 |
| 4,901,586 | 2/1990 | Blake et al. | 73/862.59 |
| 4,982,263 | 1/1991 | Spratt et al. | 357/49 |
| 5,060,526 | 10/1991 | Barth et al. | 73/778 |
| 5,090,254 | 2/1992 | Guckel et al. | 73/862.59 |
| 5,275,055 | 1/1994 | Zook et al. | 73/778 |

FOREIGN PATENT DOCUMENTS

2252824  8/1992  United Kingdom ............. 73/862.59

*Primary Examiner*—Richard E. Chilcot, Jr.
*Assistant Examiner*—James M. Olsen
*Attorney, Agent, or Firm*—Paul H. McDowall

[57] ABSTRACT

A resonant strain gauge includes a silicon substrate, a polysilicon flexure beam fixed at both ends relative to the substrate, and a polysilicon rigid cover cooperating with the substrate to enclose the flexure beam within a sealed vacuum chamber. An upper bias electrode is formed on the cover, and a lower bias electrode is formed at the bottom of a trough in the substrate directly beneath the flexure beam. A drive electrode and a piezoresistive element are supported by the beam, formed over a silicon nitride thin film layer deposited onto the top surface of the flexure beam. A second silicon nitride layer covers the drive electrode and piezoresistor, cooperating with the first silicon nitride layer to dielectrically encapsulate the drive electrode and piezoresistor. The silicon nitride further extends outwardly of the beam to a location between the polysilicon layer that contains the beam, and the cover, to isolate the cover from the flexure beam. A polysilicon film is applied over the upper silicon nitride layer as a passivation layer to protect the silicon nitride during gauge fabrication. The process for fabricating the gauge includes a sequence of applying the various polysilicon and silicon nitride layers by low pressure chemical vapor deposition, in combination with selective etching to define the flexure beam, electric circuit components and vacuum chamber.

11 Claims, 4 Drawing Sheets

DIELECTRICALLY ISOLATED RESONANT MICROSENSORS

The Government has rights in this invention pursuant to Contract No. F33615-90-C-1495, awarded by the U.S. Air Force.

BACKGROUND OF THE INVENTION

The present invention relates to transducers that employ resonant beams for measuring acceleration, pressure, temperature and other variables based on induced strain along the beam, and more particularly to the use of dielectrically isolated circuit elements formed on such beams, for oscillating the beams and sensing resonant frequencies.

Resonant sensors are well known as a means to obtain highly accurate measurements. Vibrating transducers have been used in precision accelerometers and pressure sensors. These sensors operate on the principle that the natural frequency of vibration (i.e. the resonant frequency of an oscillating beam) is a function of the induced strain along the beam. Tensile forces tending to elongate the beam increase its resonant frequency, while forces tending to compress or otherwise shorten the beam reduce its natural frequency. The frequency output of resonant gauges is readily converted to a digital reading reflecting the measured parameter, e.g. using a counter and a reference clock. Accordingly, such devices are simple and reliable, providing high discrimination while using a relatively simple interface to digital signal processing circuitry.

U.S. Pat. No. 5,090,254 (Guckel et al) discloses a resonant beam transducer including a polysilicon beam mounted to a substrate for vibration relative to the substrate, and a polysilicon shell surrounding the beam and affixed to the substrate to form a cavity which is sealed and evacuated. The beam is oscillated by supplying an oscillating voltage to an electrode on the shell.

One particularly effective device of this type is a resonant integrated microbeam sensor disclosed in U.S. patent application Ser. No. 07/937,068, filed Aug. 31, 1992, now U.S. Pat. No. 5,275,055, and entitled "RESONANT GAUGE WITH MICROBEAM DRIVEN IN CONSTANT ELECTRIC FIELD", assigned to the assignee of this application. The vibrating transducer is an elongate polysilicon flexure beam attached at both ends to a silicon substrate, and enclosed within a vacuum chamber formed by the substrate and a rigid polysilicon cover. A pair of bias electrodes on opposite sides of the beam, one formed in the substrate and the other formed in the rigid cover, cooperate to provide a constant electrical field about the flexure beam. A drive electrode on the flexure beam is selectively charged to cause the beam to oscillate. A piezoresistive element also is formed on the flexure beam, to sense beam position and generate a beam position signal used to control the drive oscillator. Thus, the beam tends to oscillate at its natural resonant frequency.

The sensor can be mounted to position the flexure member along a pressure responsive flexible diaphragm or along a beam of an accelerometer. So positioned, the beam is alternatively elongated and shortened as the diaphragm or beam fluctuates in response to pressure differentials and accelerations, respectively. The drive electrode and piezoresistor can be formed by boron ion implantation into the polysilicon flexure beam.

Figure 10:
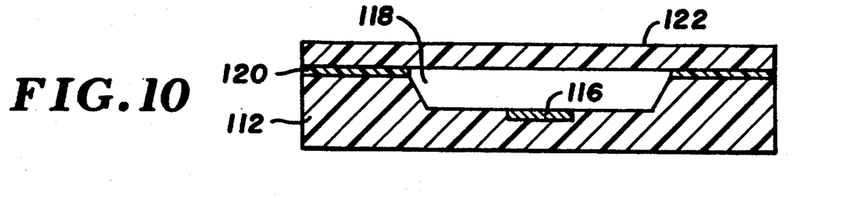

While this sensor is effective and accurate in numerous applications, it is subject to parasitic coupling from current leakage due to a parasitic capacitance between the drive electrode and piezoresistor, and between these components and the bias electrodes. The difficulty increases with smaller sized flexure beams and correspondingly reduced space available to physically separate the piezoresistor and drive electrode. One approach to counteracting parasitic coupling is shown in FIG. 10 of the aforementioned '068 patent application. A shield electrode 136 is implanted into the flexure beam, between the drive electrode and the piezoresistor. Of course, this requires additional space on the flexure beam.

Several difficulties arise from forming the piezoresistor and drive electrode by ion implantation. Due to lateral diffusion, it is difficult to precisely and repeatably determine the size and impedance of the piezoresistors and drive electrodes. Thermal transient effects limit the effectiveness of the transducers at high temperatures. Finally, the drive electrode and piezoresistor are exposed to potential degradation due to impurities or ionic contamination.

Therefore, it is an object of the present invention to provide a resonant beam sensing device in which drive electrodes and sense electrodes on the resonant beam are dielectrically isolated from one another to virtually eliminate parasitic resistive coupling between them, even at high temperatures, without the need for a shield electrode.

Another object of the invention is to provide an electrostatically driven resonant microbeam in which drive circuit element and position sensing circuit element on the beam can be effectively isolated from the beam itself.

A further object is to provide an electrostatically oscillated integrated resonant microbeam sensor capable of operation at high temperatures.

Yet another object is to provide a process for fabricating integrated resonant microbeam sensors in a manner that more precisely replicates the selected impedances of piezoresistors and drive elements formed on the flexure beams.

SUMMARY OF THE INVENTION

To achieve these and other objects, there is provided a strain responsive measuring device.

The device includes a substrate elastically deformable in response to variations in a selected parameter or value being measured. An elongate flexure element of the device has a first region fixed with respect to the substrate to position the flexure element for lengthwise extension and contraction responsive to the elastic deformation of the substrate. The flexure element includes a second region free to oscillate relative to the substrate at a natural resonant frequency. The resonant frequency varies with the extension and contraction of the flexure element. A position sensing means includes a first electrical circuit component along and integral with the flexure element. The sensing means senses the bending of the flexure element and generates a signal to indicate the position of the beam relative to the substrate. A second electrical circuit component comprises a drive electrode formed along and integral with the flexure element. A drive means is provided for generating a periodically varying drive signal and providing the drive signal to the drive electrode, to drive the flexure element in a periodic mechanical oscillation relative to the substrate. The drive means receives the position signal, and in response to changes in the position signal frequency, controllably varies the frequency of the mechanical oscillation toward coincidence with the natural resonant frequency. A dielectric encapsulation means surrounds one of the first and second electrical circuit components, thereby to dielectrically isolate said one electrical circuit component.

Preferably the dielectric encapsulation means surrounds and dielectrically isolates both of the electrical circuit components. In one version of the measuring device, the flexure element is a beam of a fine grain, low stress polysilicon, formed by selective etching after depositing a polysilicon beam layer onto the substrate. The beam is supported at both ends, whereby the medial region of the beam is the "second region" traveling transversely relative to the substrate as the beam oscillates.

The preferred encapsulation means is a first dielectric layer between the beam layer and the electrical circuit components, and a second dielectric layer applied over the first dielectric layer such that the dielectric layers cooperate to surround and envelop each of the circuit components. The preferred material used in forming the dielectric layers is silicon nitride ($Si_3N_4$). The first and second circuit components respectively comprise a piezoresistor and a drive electrode, each preferably formed of doped polysilicon. In an alternative configuration, the first circuit component is used as a capacitive sensing electrode.

The measuring device further can include a substantially rigid cover fixed with respect to the substrate, and on the opposite side of the beam layer. A first bias electrode is fixed to the cover, and a second bias electrode is fixed with respect to the substrate, thus to provide a pair of bias electrodes on opposite sides of the flexure beam and approximately equally spaced apart from the beam in the transverse direction. A dielectric isolation means between the cover and beam layer prevents the cover and layer from contacting one another directly. The bias electrodes together generate a uniform and constant electrical field in the region about the flexure element. This electrical field, in combination with the periodic signal provided to the drive electrode, oscillates the flexure beam.

Several advantages arise from the encapsulation or dielectric isolation of the piezoresistors and drive electrodes on integrated resonant microbeams. First, encapsulation virtually eliminates the parasitic coupling of these circuit components. Encapsulation protects the piezoresistors and drive electrodes against degradation due to contamination or ionic impurities. Encapsulation also facilitates providing an independent electrical connection to the flexure beam.

As compared to circuit components fabricated by ion implantation, the encapsulated piezoresistors and drive electrodes can be fabricated with considerably enhanced precision and repeatability as to size and impedance. This is due to the selective etching, following doping of the polysilicon, which precisely defines the piezoresistor and drive electrode boundaries. The problem of lateral diffusion, associated with ion implantation, is eliminated. Further, because the piezoresistor and drive electrode are more effectively isolated from one another, they can be enhanced in terms of size and impedance, or otherwise configured to receive and generate higher amplitude signals.

According to another aspect of the present invention, there is provided a process for fabricating a strain responsive electrostatically isolated resonant beam sensor. The process includes the following steps:

(a) forming a trough and an etch channel in a semiconductor substrate, with the trough and channel being open to a substantially planar surface of the substrate;

(b) filling the trough and the etch channel with a sacrificial material to provide a first sacrificial layer;

(c) depositing a semiconductor material over the semiconductor substrate planar surface and first sacrificial layer to form a first semiconductor layer;

(d) depositing a dielectric material over the first semiconductor layer to form a first dielectric thin film layer;

(e) depositing a semiconductor material over the first dielectric thin film layer to form a second semiconductor layer, and doping the second semiconductor layer to enhance its electrical conductivity;

(f) defining a plurality of electrical circuit components in the second semiconductor layer, including a position sensing component and an electrostatic drive component spaced apart from one another, and forming the electrical circuit components by selectively etching the second semiconductor layer;

(g) depositing a dielectric material over the electrical circuit components and the first dielectric thin film layer to form a second dielectric thin film layer that cooperates with the first dielectric thin film layer to encapsulate each of the electrical circuit components;

(h) defining a beam, and selectively etching the first and second dielectric thin film layers and the first semiconductor layer to form a resonant beam fixed at both ends with respect to the semiconductor substrate and having a medial region supporting the electrical circuit components, and further selectively etching to remove the semiconductor material from about the etch channel;

(i) depositing a sacrificial material over the second dielectric thin film layer to form a second sacrificial layer, and selectively etching the second sacrificial layer to define an upper cavity volume;

(j) depositing a semiconductor material over the second sacrificial layer and the second dielectric thin film layer to form a third semiconductor layer, and selectively etching the third semiconductor layer to form a cover; and (k) removing the first and second sacrificial layers by etching, and sealing the etch channel, whereby the cover and the substrate cooperate to form a sealed chamber containing the beam and the beam is free to oscillate relative to the semiconductor substrate and the cover.

The process also can include a step of depositing dielectric material over the planar surface of the semiconductor substrate and the first sacrificial layer (before step c above), to form a third dielectric thin film layer between the semiconductor substrate and the first semiconductor layer. The first and second dielectric thin film layers preferably cover the first semiconductor layer over a range sufficient to insure that these thin film layers are between the first semiconductor layer and the third semiconductor layer that forms the cover. Given these additional steps, the semiconductor layer containing the flexure beam is dielectrically isolated from the substrate, and from the cover. This facilitates formation of an isolated electrical contact directly onto the beam, and more effectively isolates bias electrodes formed on the cover and the substrate.

It is advantageous to deposit semiconductor material over the second dielectric thin film layer (following step g above) to form a passivation layer that covers the second dielectric thin film layer. The passivation layer enhances the fabrication process, by protecting the underlying dielectric layer during removal of the sacrificial layers, typically by selective etching.

The preferred dielectric material for the dielectric thin film layers is silicon nitride. The preferred material for the semiconductor layers is a fine grain, low stress polycrystalline silicon.

Thus, in accordance with the present invention, sensing devices that employ integrated resonant microbeams that carry piezoresistive and electrostatic drive elements, can measure selected parameters with greater accuracy, in high temperature or other demanding environments, over a longer useful life.

IN THE DRAWINGS

For a further understanding of the above and other features and advantages, reference is made to the following detailed description and to the drawings, in which.

DETAILED DESCRIPTION OF THE PREFERRED EMBODIMENT

Figure 1:
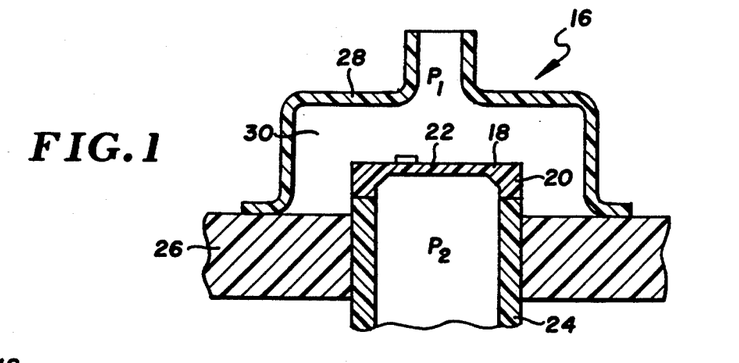
FIG. 1 is an elevational view in section of a pressure sensing device constructed in accordance with the present invention.
Figure 2:
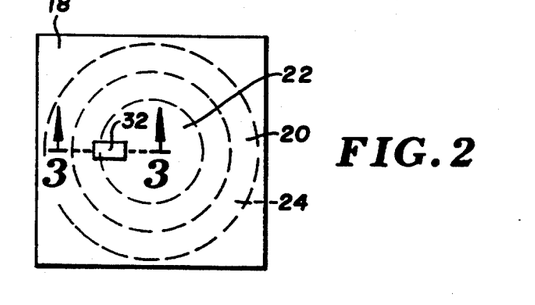
FIG. 2 is a top plan view of the pressure sensing device.

Turning now to the drawings, there is shown in FIGS. 1 and 2 a pressure sensing device 16. The device includes a silicon substrate or base 18 having a substantially rigid but somewhat flexible peripheral region or rim 20, and a diaphragm 22 surrounded by the rim. The diaphragm is substantially circular in profile, with the diameter being in the range of 4–150 mils, more preferably 25–100 mils. Square or rectangular diaphragms also may be employed. The diaphragm is flexible and has a thickness in the range of about 10–100 micrometers. The bottom of peripheral rim 20 is thermoelectrically bonded to a tube 24 of Pyrex (brand) glass or other suitable material, for example ceramics, mullites, certain plastics or silicon. Tube 24 is supported within a rigid frame or other structure 26. A cover 28 is fastened to the support structure, and cooperates the structure to define a chamber 30. Thus, sensing device 16 is positioned at the interface of chamber 30 and the interior of tube 24.

A pressure responsive resonant strain gauge 32 is mounted on the top of sensing device 16 along diaphragm 22 near rim 20, i.e. near the outer edge of diaphragm 22. While diaphragm 22 is seen as circular in FIG. 2, it is to be appreciated that the diaphragm can be formed to have a different profile if desired, e.g. square or rectangular. Anisotropic etching is employed to form the rectangular or square diaphragm, while isotropic etching techniques are employed to form circular diaphragms.

Figure 3:
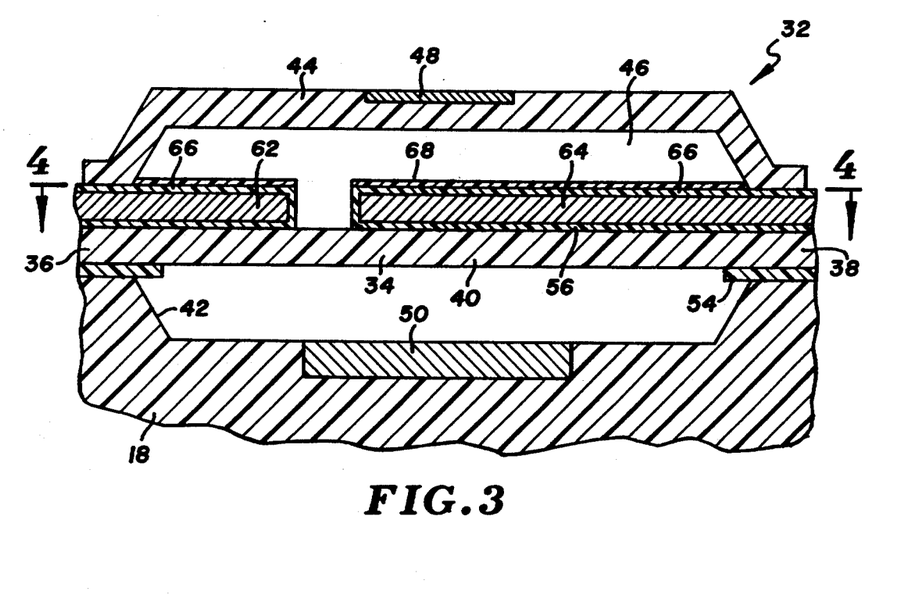
FIG. 3 is an enlarged partial view of FIG. 1, illustrating an integrated resonant strain gauge of the pressure sensing device.

As seen in FIG. 3, resonant gauge 32 includes an elongate resonant beam 34 preferably formed of a fine grain, low tensile strain polysilicon (polycrystalline silicon). Beam 34 has a length in the range of about 50–1000 micrometers and more preferably about 200 micrometers, a thickness of about 0.5–3 micrometers (more preferably 2 micrometers), and a width in the range of about 20–100 micrometers (more preferably 40 micrometers). Beam 34 is elongate in a longitudinal direction (e.g. from left to right in FIG. 3), and has opposite ends 36 and 38 fixed with respect to the substrate, more particularly diaphragm 22. Due to the elasticity of beam 34, the beam can be caused to oscillate whereby a medial region 40 of the beam reciprocates transversely (vertically in FIG. 3) relative to the diaphragm, while beam ends 36 and 38 remain integral with the diaphragm. A well or trough 42 is formed into diaphragm 22 immediately below medial region 40, to accommodate beam oscillation.

A substantially rigid shell or cover 44, formed of polysilicon, is fixed with respect to the diaphragm and positioned directly above the beam. The cover and substrate cooperate to define a chamber 46. Beam 34 oscillates within the chamber, which is evacuated to provide a vacuum. An upper bias electrode 48 is formed onto a surface portion of cover 44, by ion implantation. A lower bias electrode 50 similarly is formed onto a surface of diaphragm 22 along the bottom of trough 42. Bias electrodes 48 and 50 are employed in concert to generate a constant and uniform electrical field in the region about beam 34. Further electrical circuit components, integral with beam 34, are used to oscillate the beam and to sense the beam position relative to the substrate and cover.

Figure 4:
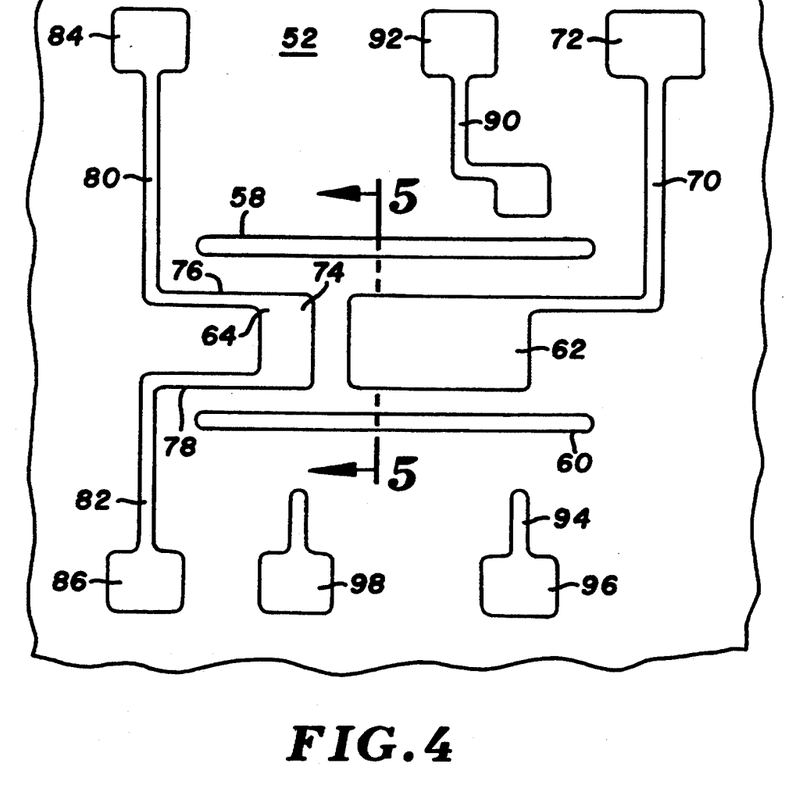
FIG. 4 is a sectional view taken along the line 4—4 in FIG. 3.
Figure 5:
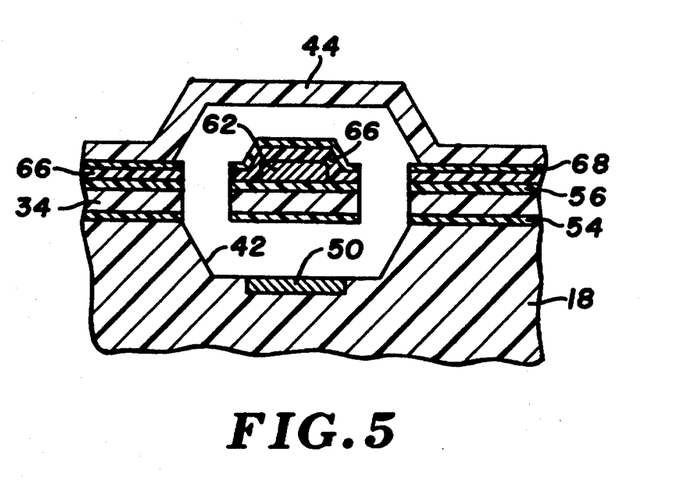
FIG. 5 is a view taken along the line 5—5 in FIG. 4, to illustrate a microbeam of the resonant gauge, and certain circuitry carried on the microbeam layer.

Beam 34 is formed as part of a larger polysilicon thin film, i.e. a beam layer 52 (FIG. 4). Beam layer 52, while integral with substrate 18 and cover 44, contacts neither. Rather, several dielectric layers, preferably formed of silicon nitride ($Si_3N_4$), isolate beam layer 52 from the substrate and from the cover. More particularly, a dielectric thin film layer 54 lies between substrate 18 and beam layer 52, and a dielectric thin film layer 56 is formed over the top surface of beam layer 52. Dielectric layers 54 and 56 have thickness dimensions in the range of about 800 (or 400–4000) angstroms.

The shape of beam 34 is defined by a pair of spaced apart longitudinal gaps 58 and 60 through beam layer 52 and its adjacent dielectric layers. Beam 34 supports electrical circuitry used in oscillating the beam and in sensing its position as it oscillates. Such circuitry includes a drive electrode 62 and a piezoresistor 64, both formed along the top surface of dielectric layer 56. The drive electrode and piezoresistor are coplanar but spaced apart from one another. Drive electrode 62 and piezoresistor 64 are electrically isolated from one another, due to their physical separation, and also because each of these components is dielectrically encapsulated by dielectric layer 56 in cooperation with a further dielectric layer 66 applied over layer 56. As best seen in FIGS. 3, dielectric layers 56 and 66 cooperate to completely envelop the circuit components. While encapsulation is illustrated only in connection with the drive electrode and piezoresistor, it is to be understood that the necessary conductive paths to these components are likewise encapsulated by layers 56 and 66.

This approach is a departure from earlier methods of fabricating drive electrodes and piezoresistors, not only due to the dielectric encapsulation, but also due to the positioning of these components over the top of beam 34. By contrast, earlier counterparts of these components have been formed by boron ion implantation, and thus embedded into the beam.

Several advantages arise from encapsulating these circuit components rather than implanting them. First, there is no lateral diffusion of dopants, resulting in more precise and consistent formation of circuit components in terms of their size and impedance. Resistor values can be more closely matched. Second, the circuit components are dielectrically isolated from beam 34, facilitating the use of an independent electrode fabricated directly onto the beam. The piezoresistor and drive electrode are more effectively isolated from one another, virtually eliminating any leakage between them. Encapsulated components can be fabricated for increased impedance and signal handling capacity for improved performance. Finally, encapsulated components are able to withstand higher temperatures, during gauge fabrication and operation.

A polysilicon passivation layer 68 is formed over dielectric layer 66, preferably to a thickness of about 1600 angstroms. While the passivation layer is not essential to operation of the strain gauge, layer 68 protects the underlying silicon nitride layer during fabrication, specifically during removal of the chamber defining sacrificial layer by selective etching.

The layers involved in fabricating resonant strain gauge 32 have thicknesses that vary according to the expected use and environment for the gauge. However, in one preferred example, various layers (including sacrificial layers) were applied to the following thicknesses, in microns:

| Cover 44 | 2.0 |
| --- | --- |
| Passivation layer 68 | 0.16 |
| Dielectric layer 66 | 0.08 |
| Drive electrode 62 | 0.44 |
| Piezoresistor 64 | 0.44 |
| Dielectric layer 56 | 0.08 |
| Beam layer 52 | 2.0 |
| Dielectric layer 54 | 0.08 |
| Lower bias electrode 50 | 2.0 |

As best seen in FIG. 4, drive electrode 62 is substantially rectangular, although the shape is not critical. A conductive line 70 electrically couples the drive electrode with a beam drive contact pad 72. Piezoresistor 64 includes an enlarged portion 74 and two relatively thin legs 76 and 78 coupled to the enlarged portion. Conductive paths 80 and 82 electrically couple legs 76 and 78 to respective sensor bias contact pads 84 and 86. The electrical impedance of legs 76 and 78 is substantially greater than that of enlarged portion 74. Accordingly, nearly all of the voltage differential between bias pads 84 and 86 occurs along the legs. This allows maintaining enlarged portion 74 at a desired voltage level, preferably ground.

Further circuitry illustrated includes a conductive path 90 that couples upper bias electrode 44 (alternatively, cover 44 in the event that the entire cover functions as an electrode) to an upper bias contact pad 92. A conductive path 94 couples a contact pad 96 to lower bias electrode 50. A beam layer contact pad 98 is electrically coupled through beam poly 52 to beam 34.

Pressure sensing device 16 measures a pressure differential, i.e. the difference between pressures $P_1$ and $P_2$ on opposite sides of diaphragm 22, based on the frequency at which beam 34 oscillates. More particularly, when diaphragm 22 flexes in response a pressure differential, it produces axial or longitudinal stress upon beam 34, altering the strain along the beam. Downward diaphragm flexure tends to elongate beam 34 and increase its natural frequency. Conversely, upward diaphragm deflection tends to allow beam contraction or compress the beam, thus to reduce its natural resonant frequency.

To maintain oscillation of the beam, a periodically oscillating voltage level is provided to drive electrode 62, while a substantially uniform constant electrical field is maintained in the region about the beam. For a more detailed explanation of beam oscillation, reference is made to the aforementioned Application Ser. No. 07/937,068, incorporated by reference herein. Piezoresistor 64 functions as a means for detecting the instantaneous position of beam 34 relative to the substrate and cover, by generating a detector voltage that varies with the beam position, and thus is a periodic signal when the beam is oscillating.

The detector voltage is provided as an input to an oscillator circuit 100 (FIG. 6), the output of which is the periodic drive voltage signal. The drive signal is provided to drive electrode 62, to maintain beam 34 in steady state oscillation at its natural resonant frequency. For a polysilicon beam like beam 34, the natural resonant frequency tends to be in the range 200–500 kHz. The oscillator circuit provides a closed loop for continually adjusting the drive signal frequency toward coincidence with the natural resonant frequency.

Figure 6:
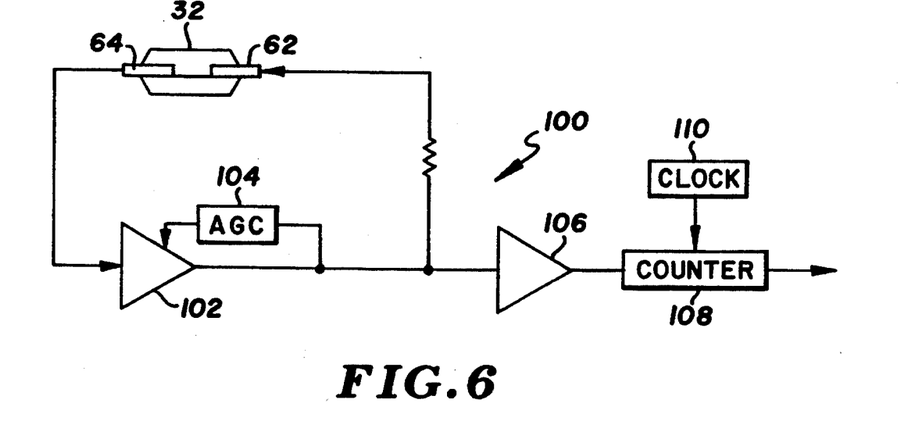
FIG. 6 is a schematic view of the resonant strain gauge and associated circuitry for oscillating the resonant beam and for sensing beam position.
Figure 7:
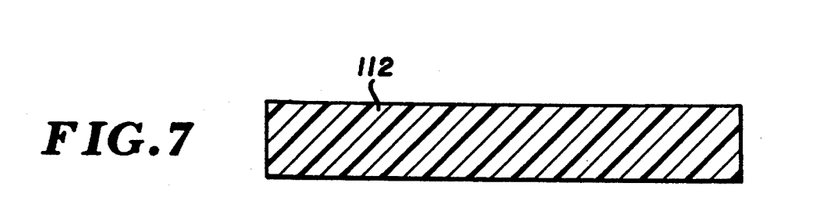
FIGS. 7–17 illustrate successive steps in the fabrication of the resonant strain gauge.
Figure 8:
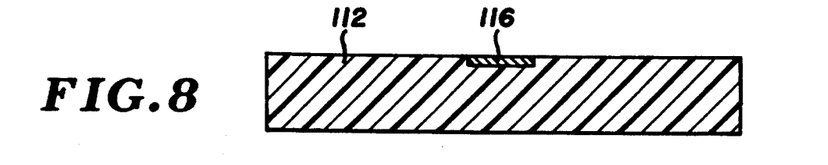
Figure 9:
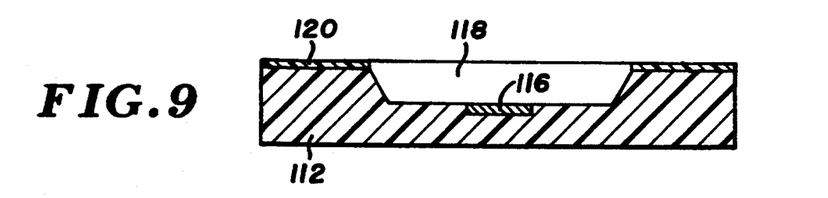

As beam 34 mechanically oscillates, piezoresistor 64 provides the detector signal as an input to an amplifier 102 of the oscillator circuit. The detector signal is a voltage that oscillates at the same frequency as the beam oscillation frequency. An automatic gain control circuit 104 provides feedback to amplifier 102, to prevent distortion of the oscillation frequency. The drive signal is based upon the output of amplifier 102.

The output of amplifier 102 is provided to an output buffer amplifier 106. The buffer amplifier output is provided to a digital counter 108 controlled by a clock oscillator 110. The counter output is provided to digital circuitry (not shown) for a direct, real time reading of strain, pressure, acceleration or another parameter that influences the resonant frequency of the oscillating beam.

Should a change in strain cause the beam to oscillate at a different frequency, the frequency change is sensed in piezoresistor 64 and the detector signal is provided to amplifier 102 at the altered frequency. The output of amplifier 102 likewise is altered, to change the drive voltage signal frequency. Thus, the drive signal frequency is continually and controllably adjusted toward coincidence with the natural resonant frequency of the beam. A high degree of accuracy and sensitivity to slight changes in strain is achieved, because the resonant frequency undergoes a considerable change for even slight variations in strain. For a more detailed illustration and explanation of the oscillator circuit, reference is made to the aforementioned application Ser. No. 07/937,068.

Pressure sensors like device 16 can be fabricated using equipment already known and available in the semiconductor arts, according to a low pressure chemical vapor deposition (LPCVD) process illustrated in FIGS. 8-17. The process begins with a silicon wafer 112 from which multiple sensing devices are fabricated. The wafer preferably is a P-Type silicon with an N-Type epilayer typically 10–100 microns thick.

The first step (FIG. 8) involves local ion implantation of boron to form a p-type lower electrode 116 in the n-type epi. Alternatively, an n-type ion implant can be used into p-type material. A lower sacrificial oxide layer 118 is formed in the substrate by local oxidation. A patterned layer of thin oxide and thin nitride is used to perform the local oxidation. The oxide and nitride layers are patterned and etched to form the etch channels and a dielectric layer 120.

Next, polysilicon is deposited over dielectric layer 120 to form a resonant beam layer 122. The beam layer is on the order of 2 microns thick.

Figure 12:
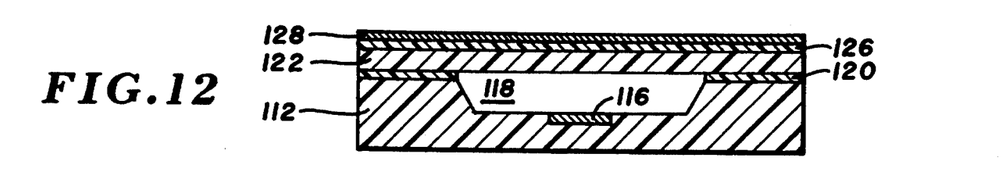
Figure 13:
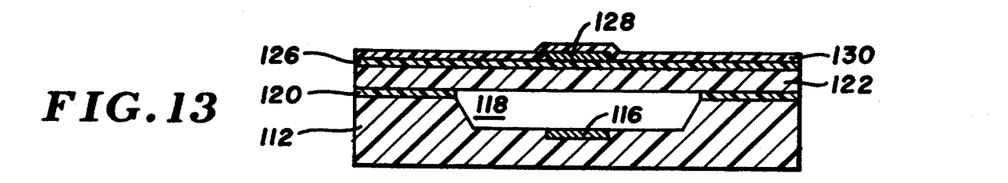
Figure 14:
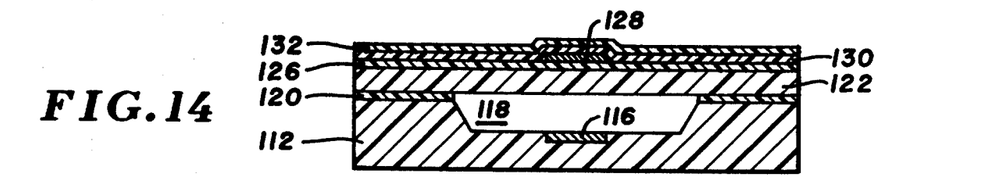

Next, silicon nitride is deposited onto the beam layer to a thickness of about 800 angstroms, to provide a dielectric layer 126. Polysilicon then is deposited onto dielectric layer 126 to form a semiconductor layer 128 having a thickness of about 4400 angstroms. Semiconductor layer 128 is doped with boron or phosphorous to considerably enhance its electrical conductivity. The result of these process steps is shown in FIG. 12.

Next, a drive electrode, piezoresistor and their associated conductive paths are patterned onto semiconductor layer 128. The layer is then selectively etched, removing all doped polysilicon except for the aforementioned circuit components. Further silicon nitride is deposited at a thickness of 800 angstroms, to provide a dielectric layer 130. Dielectric layers 126 and 130 cooperate to dielectrically encapsulate the circuit components. Because the piezoresistor, drive electrode and associated conductive paths are formed by etching rather than by implantation, they are better defined and more precisely controlled. Finally, further polysilicon (undoped) is applied over dielectric layer 130, forming a passivation layer 132 approximately 400–2000 angstroms in thickness. The passivation layer protects the underlying silicon nitride layer during a subsequent etching to remove the sacrificial layers.

Figure 15:
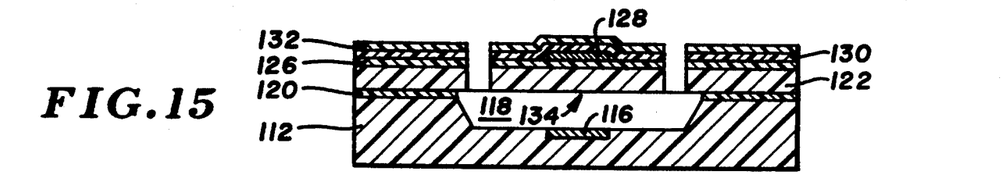

FIG. 15 illustrates the result of the next steps, which include patterning (i.e. defining) the beam, and selectively etching all layers above the substrate and sacrificial layer 118, where necessary to define the size and shape of a resonant beam 134.

Figure 16:
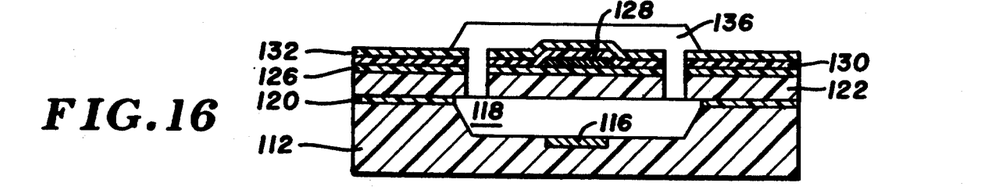

Next, a low temperature oxide is deposited as a sacrificial layer 136, patterned to define an upper cavity and etched to provide the upper cavity volume. The result is seen in FIG. 16.

Figure 17:
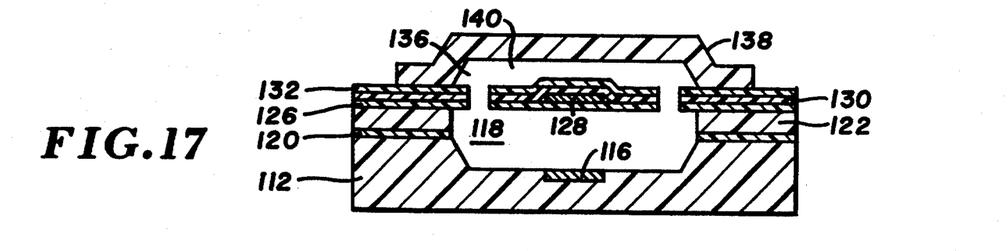

Following definition of the upper cavity, polysilicon is deposited onto the second sacrificial layer and the top dielectric layer, to form a cover layer 138, implanted and annealed to form the upper bias electrode. The cover layer is selectively etched to provide the cover. As seen in FIG. 17, the cover is completely isolated from beam layer 122 by the dielectric layers.

Following cover fabrication, the sacrificial layers 118 and 136 are removed by an HF etching process to form a chamber 140.

Then, a vacuum is formed within chamber 140 by lightly oxidizing exposed surface areas and sealing with a layer of LPCVD polysilicon. The resulting growth of silicon dioxide seals the etch channels. Some of the residue silane gas remains trapped in chamber 140, and polysilicon growth continues until such silane is depleted.

Finally, contact areas are defined, and the oxide etched from these areas. A metallization layer, e.g. aluminum, is deposited, patterned, and selectively etched to provide the metal contact pads 142. This is followed by an alloying step.

In a final step not illustrated, the opposite side of the silicon wafer is selectively etched to form a diaphragm corresponding to each strain gauge, to position each strain gauge near the periphery of its corresponding diaphragm as illustrated in FIGS. 1 and 2 for diaphragm 22 and strain gauge 32.

Figure 11:
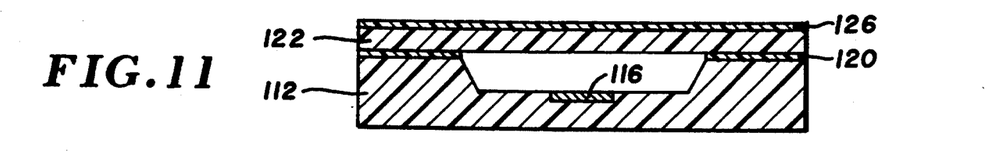

While the resonant strain gauge of the present invention has been described in connection with a pressure sensing device, it is to be appreciated that the strain gauge can be employed in any configuration in which a measured quantity can control induced strain. For example, a resonant strain gauge can be mounted to the flexible neck between the rigid mount and the rigid proof mass of an accelerometer, as shown in FIG. 11 of the aforementioned U.S. application Ser. No. 07/937,068. Regardless of the application, dielectric thin film layers are employed to isolate the flexure beam, to dielectrically encapsulate the piezoresistor and drive electrode carried by the flexure beam, and to more effectively isolate the bias electrode mounted in the cover. The encapsulated circuit components can be fabricated to meet considerably higher tolerances for impedance and physical dimensions, as they are formed by etching rather than by ion implantation. The piezoresistor can be fabricated to have a higher impedance and generate a higher amplitude position signal, due to the improved dielectric isolation. The encapsulated components are able to withstand higher temperatures during fabrication and operation of the gauge. Consequently, resonant gauges fabricated according to the present invention offer enhanced performance in demanding environments, particularly those involving high temperatures.

What is claimed is:

1. A strain responsive measuring device, including:
    a substrate elastically deformable in response to variations in a selected parameter;
    an elongate flexure element formed of polysilicon deposited onto and etched from the substrate to define a beam, and having a first region comprising opposite end portions of the flexure element fixed with respect to the substrate to position the flexure element for lengthwise extension and contraction of the flexure element responsive to the elastic deformation of the substrate, said flexure element further including a second region comprising a medial portion of the flexure element free to oscillate relative to the substrate at a natural resonant frequency that varies with said extension and contraction;
    a position sensing means including a first electrical circuit component along and integral with the flexure element, for sensing the position of the flexure element relative to the substrate and generating a position signal to indicate said position;

a second electrical circuit component comprising a drive electrode spaced apart from and electrically isolated from the first circuit component; and a dielectric encapsulation means surrounding and dielectrically isolating said first and second electrical circuit components, comprising a first dielectric thin film layer between the beam and the first and second electric circuit components and a second dielectric thin film layer cooperating with the first dielectric thin film layer to surround each of the first and second electrical circuit components; and further comprising a passivation layer covering the second dielectric layer, with the passivation layer and the electric circuit components being on opposite sides of the second dielectric layer.

2. An apparatus for sensing variations in strain, including:

a substrate, and a first bias electrode fixed with respect to a substrate surface portion of the substrate;

a flexure element formed of polysilicon deposited onto and etched from the substrate to define a beam elongated in a longitudinal direction, having a first region comprising opposite ends of the flexure element fixed with respect to the substrate and a second region comprising a medial portion of the flexure element free to oscillate at a resonant frequency, said resonant frequency varying with changes in strain due to external forces acting upon the flexure element, said flexure element being transversely spaced apart from the first bias electrode;

a substantially rigid cover fixed with respect to the substrate and having a cover surface portion transversely spaced apart from the flexure element and disposed on the opposite side of the flexure element from the substrate surface portion, and a second bias electrode fixed with respect to the cover at a cover surface portion;

a biasing means for biasing the first bias electrode and the second bias electrode at respective different voltage levels, to generate a substantially constant electrical field in the region about the flexure element;

a position sensing means including a first electrical circuit component along and integral with the flexure element, for sensing the position of the flexure element relative to the substrate and generating a position signal to indicate said position;

a second electrical circuit component comprising a drive electrode along and integral with the flexure element;

a drive means for generating a periodically varying drive signal and providing the drive signal to one of the drive electrode, the first bias electrode and the second bias electrode, thus to drive the flexure element in a periodic mechanical oscillation relative to the substrate, said drive means receiving the position signal and controllably altering the frequency of said mechanical oscillation toward coincidence with the natural resonant frequency, in response to changes in the position signal frequency; and a dielectric encapsulation means, surrounding and dielectrically isolating the first and second electrical circuit components and comprising a first dielectric thin film layer between the beam and the electric circuit components, and a second dielectric thin film layer cooperating with the first dielectric thin film layer to surround each of the electric circuit components wherein the encapsulation means is formed between the cover and the beam, to dielectrically isolate the cover from the beam and from the substrate; and, a passivation layer covering the second dielectric layer, wherein the passivation layer and the electrical components are on opposite sides of the second dielectric layer.

3. A process for fabricating a strain responsive electrostatically oscillated resonant beam sensor, including the steps of:

treating a semiconductor substrate by local oxidation to form a trough and an etch channel of a sacrificial material in the semiconductor substrate, with the trough and channel being open to a substantially planar surface of the substrate;

depositing semiconductor material over the semiconductor substrate and first sacrificial layer to form a first semiconductor layer;

depositing dielectric material over the first semiconductor layer to form a first dielectric thin film layer;

depositing semiconductor material over the first dielectric thin film layer to form a second semiconductor layer, and doping the second semiconductor layer to enhance its electrical conductivity;

defining at least one electric circuit element in the second semiconductor layer by selectively etching the second semiconductor layer;

depositing dielectric material over the electric circuit elements and the first dielectric thin film layer to form a second dielectric thin film layer that cooperates with the first dielectric thin film layer to dielectrically encapsulate the at least one electrical circuit element;

defining a resonant flexure beam, and selectively etching the first and second dielectric thin film layers, and the first semiconductor layer to form the resonant beam as fixed at at least on end thereof with respect to the semiconductor substrate and having a region supporting the at least one electrical circuit element, said selective etching further removing the semiconductor material from about the etch channel;

depositing sacrificial material over the second dielectric thin film layer to form a second sacrificial layer, and selectively etching the second sacrificial layer to define an upper cavity volume;

depositing semiconductor material over the second sacrificial layer, to form a third semiconductor layer, and selectively etching the third semiconductor layer to form a cover; and removing the first and second sacrificial layers by etching, and sealing the etch channel, whereby the cover and the substrate cooperate to form an enclosed chamber containing the beam, and the beam is free to oscillate relative to the semiconductor substrate and the cover.

4. The process of claim 3 including the further step of:

depositing the dielectric material over the planar surface of the semiconductor substrate and the first sacrificial layer, before the step of forming the first semiconductor layer, to form a third dielectric thin film layer between the substrate and the first semiconductor layer.

5. The process of claim 4 including the step of:

depositing at least one of the first and second dielectric layers between the first semiconductor layer and the third semiconductor layer to isolate the cover from the first semiconductor layer.

6. The process of claim 3 further including the step of:
depositing a semiconductor material over the second dielectric thin film layer, after the step of depositing the second dielectric thin film layer, to form a passivation layer over the second dielectric thin film layer.

7. The process of claim 6 wherein:
the passivation layer is formed to a thickness and a range of 400–2000 angstroms.

8. The process of claim 3 including the further step of:
after the step of forming the trough and etch channel and before filling the trough and etch channel with the sacrificial material, defining a first bias electrode in the trough and forming the first bias electrode by ion implantation.

9. The process of claim 8 including the further step of:
after the step of etching the third semiconductor layer to form the cover, defining a second bias electrode in the cover and forming the second bias electrode by ion implantation.

10. The process of claim 3 wherein:
the first and second dielectric thin film layers are each formed to a thickness of about 800 angstroms, and the second semiconductor layer is formed to a thickness of about 4400 angstroms.

11. The process of claim 3 wherein:
the first and second dielectric thin film layers are each formed to a thickness of about 400 angstroms, and the second semiconductor layer is formed to a thickness of about 4400 angstroms.

* * * * *